United States Patent [19]

Farrell

[11] Patent Number: 5,241,995
[45] Date of Patent: Sep. 7, 1993

[54] METHOD OF FILLING A SUSPENDED PARTICLE DISPLAY

[75] Inventor: James F. Farrell, Etobicoke, Canada

[73] Assignee: Litton Systems Canada Limited, Etobicoke, Canada

[21] Appl. No.: 765,223

[22] Filed: Sep. 24, 1991

[51] Int. Cl.$^5$ .............................................. B65B 31/04
[52] U.S. Cl. .......................................... 141/4; 141/7; 141/59
[58] Field of Search .............. 141/1, 4, 5, 7, 86, 141/311 A, 59; 359/62, 80, 99–102

[56] References Cited

U.S. PATENT DOCUMENTS

| 4,135,789 | 1/1979 | Hall | 359/80 |
| 4,615,362 | 10/1986 | Hartman et al. | 141/86 |
| 4,922,972 | 5/1990 | Watanabe et al. | 141/5 |
| 5,070,806 | 12/1991 | Coster | 141/86 X |
| 5,137,484 | 8/1992 | Bohannon | 141/7 |

FOREIGN PATENT DOCUMENTS 0016647  2/1978  Japan ...................... 359/62

Primary Examiner—Ernest G. Cusick
Attorney, Agent, or Firm—Edmund W. Rusche

[57] ABSTRACT

A method and apparatus are disclosed for controllably filling a confined optical cavity primarily with a volatile fluid suspension where a controlled slight pressure is used to force the fluid into the cavity and is followed by adjusting the equilibrium with a slight negative pressure or possibly atmospheric pressure applied at an exit port to the cavity. This method and apparatus is particularly suited to the filling of light valves which are configured with parallel plates positioned by very small distances between one another to create the cavity which is to be filled with the volatile fluid suspension.

6 Claims, 2 Drawing Sheets

FIG. 1
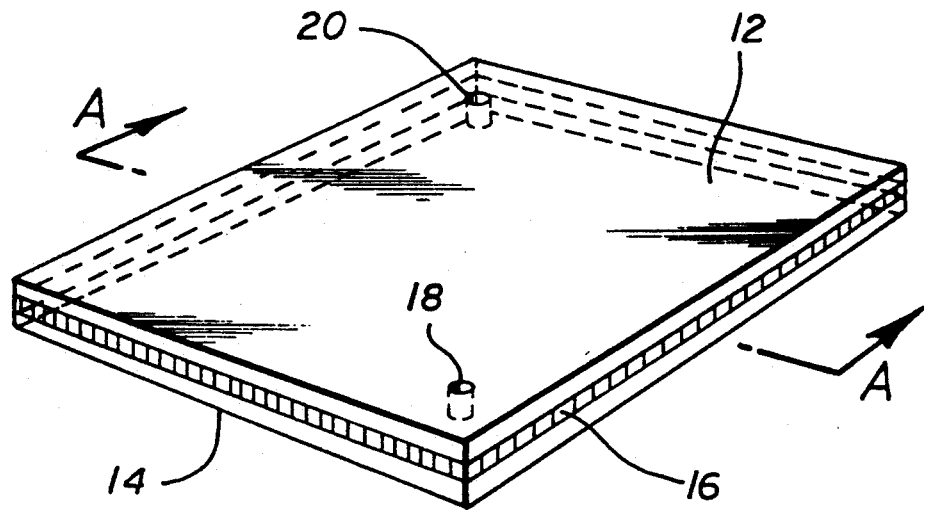
FIG. 2
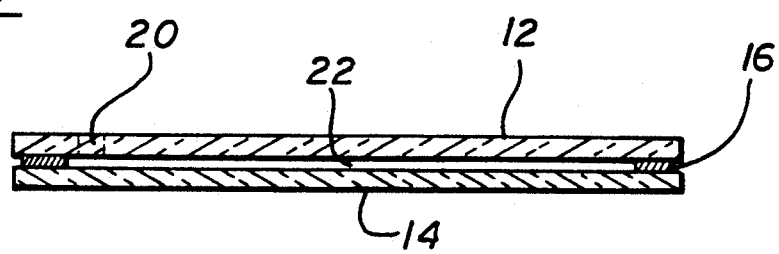
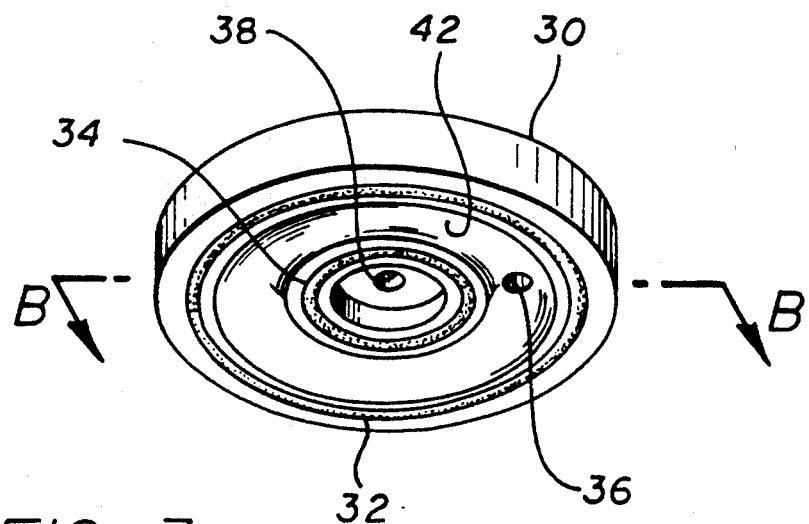
FIG. 3

METHOD OF FILLING A SUSPENDED PARTICLE DISPLAY

BACKGROUND OF THE INVENTION

This invention relates to a method of filling a narrow, flat display system cavity with liquids highly volatile in nature and prepared to contain particulate matter evenly disbursed throughout the liquid volume. Fluid suspensions used in the context of this invention include liquid colloidal suspensions and emulsions with particles having the properties of responding to an applied electric field across a thin portion of the fluid suspension to affect intensity of light transmitting through the fluid suspension.

Such devices are known as light valves and are usually constructed of two transparent flat substantially parallel walls which are separated by a relatively small distance, generally on the order of 0.5 mil to 50 mils, and are sealed around the periphery to form an enclosed hermetically sealed cell. Thin conductive transparent coatings are applied on the interior or exterior surfaces of the walls and the cell is filled with a fluid suspension containing particles affected by the application of an electric field. Light valves can be used to allow or disallow transmission of light through the cell.

In the usual case, when a voltage is applied to the conductive coatings of the light valve (i.e., across the fluid suspension) the particles align perpendicular to the walls of the cell in a manner that the suspension appears transparent to the light passing through. When no voltage is applied, the particles are randomly disbursed by Brownian motion and in this condition the fluid suspension appears dark, extinguishing visible light rays attempting to pass through the suspension.

In filling the cavity of the light valve cell certain problems are encountered which cause a lack of uniformity or homogeneity over the surface area of the cell. One such problem is caused by the basic physical properties of volatile liquids which are used to make up the fluid containing the suspended particles. Volatile liquids with high vapor pressure tend to vaporize easily into gaseous form causing bubbles or voids when they are drawn into the cavity by a vacuum applied at an end opposite to a reservoir of the fluid which is fitted to allow the fluid to enter the cavity. Once gas voids or bubbles are formed they are difficult to eliminate within the cavity.

A second problem arises during filling a cavity under pressure by pumping in the fluid suspension. The thin transparent glass plates used a flat walls in the light valve tend to bow outward from the slight difference in pressure between the liquid suspension within the light valve and the atmospheric pressure outside. This problem becomes more severe the larger the surface area of the light valve cell becomes.

This bowing or distortion of the surface plates leads to a light valve cavity that is not uniform in thickness. The plates will be separated more at points away from the fixed boundaries. Therefore, the thickness of the suspension through which the light passes will differ throughout the cell cavity. Accordingly, the optical density will vary from point to point within the light valve cell.

It is further recognized that such variation in the thickness of the fluid suspension causes variations in the electric field gradient which itself causes pronounced variations in light transmission characteristics from point to point within the cell. Bowing and distortion of the glass walls can also cause fracturing of the walls of the cell, rupturing of the seals or other serious damage.

Therefore, it is important that the cell walls be returned to, or kept in approximately the same flat, parallel relationship as before the fluid was added to the cell. This will protect against physical damage and distortions as well as provide that the optical properties of the light transmission through the cell be uniformly controllable.

One method at solving this particular problem is presented in the U.S. Pat. No. 3,744,126 by Forlini et al. This patent discloses a method utilizing a single fill port for both filling the cell with a fluid and withdrawing some of the fluid later to reduce the internal pressure. The method presented also allows for the existence within the cell of small quantities of vapor or air pockets to exist, although it is claimed that these small voids cause no adverse affect to the cells performance.

U.S. Pat. Nos. 3,742,600 and 3,912,365 by Lowell present a method for inserting small spherical beads into the cavity of a light valve, where such spheres have a diameter equivalent to the desired spacing between the plates of the light valve. The small non-deformable beads therefore, when distributed throughout the suspension, tend to prevent the walls from coming closer together than the preferred distance of their diameter when a pressure difference between the liquid within the cavity and the surrounding environment is such as to tend to compress the content of the cavity. This situation would occur if, in order to reduce the positive differential in pressure which would cause outward bowing of the plates, the liquid mixture was subjected to a slight vacuum thereby reducing the pressure differential to a negative value.

The U.S. Pat. No. 4,078,856 by Thompson et al presents a general description of a light valve cell and the fluid suspension which controls the transmission of radiation through the cell.

SUMMARY OF THE INVENTION

It is an object of this invention to provide a method for filling flat parallel plate light valve cavities with volatile fluid mixtures in a manner that the parallel spacing of the flat bounding plates remains in a essentially uniform optically flat relationship.

It is a further object of this invention to provide a method for filling light valve cavities with volatile fluid mixtures and maintaining a flat parallel relationship between the cavity walls in a manner which is amenable to effective and efficient manufacturing and production processes.

Present manufacturing methods of filling liquid crystal displays and shutters uses the vacuum fill technique. With this technique the assembled and properly spaced liquid crystal display panel is evacuated in a chamber while the liquid crystal fluid at atmospheric pressure is placed over the panel single fill port. The chamber is then vented to the liquid crystal fluid and the atmospheric pressure forces the fluid into the evacuated panel.

This technique proves effective because the vapor pressure of the liquid crystal fluid is low. Therefore, its composition is unaffected by exposure to moderate vacuum levels, such as 0.002 tor to 0.100 tor. Suspended particle fluids, on the other hand, contain hydrocarbon oils which have fairly high vapor pressure points. Such volatile fluids could face a drastic change in their composition if the fluid surface were exposed to even a minimal vacuum. A way to compensate for this effect would be to introduce a partial pressure (or partial pressures) of the volatile components of the fluid into the vacuum chamber. This technique would be less than satisfactory since it tends to complicate what should be a simple procedure.

This invention introduces a pressure filling process for panels or shutters that will work for both volatile and non-volatile fluids. The fluid is introduced into the panel through a small hole placed near a corner or edge in one of the plates. Under the slight pressure of the fluid filling the cavity air escapes through a similar 'exit' hole located at the opposite corner or edge of the panel.

The fluid is channeled into the small filling hole by means of a fill disk. The fill disk is placed against the plate of the light valve chamber and held firmly to the plate by means of a vacuum.

The volatile fluid is pressurized by either a simple syringe or a pump device. An advantage of this technique is that quite high pressure can be obtained in the fluid, whereas with a vacuum filled technique, this system is limited at maximum to atmospheric pressure difference only. The use of higher pressures facilitates more rapid filling of the cavities and accommodates manufacturing processes more effectively. Under pressure the fluid is allowed to fill the cavity until it begins to exit at the opposite exit port.

At this point the system may be allowed to reach an equilibrium state with one port usually the exit port adjusted to atmospheric pressure. Alternatively, with the pressure of the filling fluid removed, a slight vacuum may be applied to either port to bring the fluid pressure within the cavity to some predetermined value acceptable for maintaining the plates of the chamber parallel and flat to preserve optical characteristics desired for the transmitted light.

When the filling process is complete, all equipment used for filling is removed and the filling and exit ports or sealed to complete a hermetic seal to the contents of the cavity.

BRIEF DESCRIPTION OF THE DRAWINGS

FIG. 1 shows a flat panel light valve with the fill an exit ports installed in the upper flat plate.

FIG. 2 shows a view A—A of a cross section through the light valve of FIG. 1.

FIG. 3 shows the portion of the fill disk which will be brought in contact above the fill hole (or exit hole) on the light valve plate.

DETAILED DESCRIPTION OF THE PREFERRED EMBODIMENT

Figure 4:
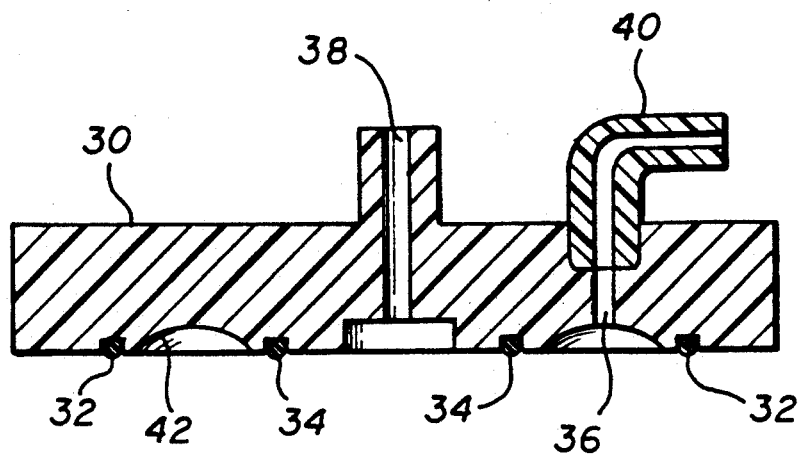
FIG. 4 shows a cross sectional view B—B through a diameter of the pressure fill disk shown in FIG. 3.

Broadly, the method and apparatus for supporting this invention is one for filling a cavity with a volatile fluid by establishing an entry port and exit port in the cavity to be filled; attaching a reservoir to the exit port for receiving the overflow of said volatile fluid during filling of the cavity; fitting a filling vessel to the entry port to allow the volatile fluid to be forced into the cavity; applying a pressure to the volatile fluid to force the fluid to fill a cavity and to flow into the reservoir at the exit port; and thereafter, providing for the pressure to reach a predetermined equilibrium level as controlled either by the reservoir or the filling vessel. Following achievement of equilibrium the entry and exit ports are closed to complete a hermetic sealing of the cavity.

A light valve cell is shown in FIG. 1 where two optically transparent plates 12 and 14, are fastened together by a spacing seal 16 which extends completely around the circumference of the plates, i.e., around the area through which the light is to be controllably transmitted. A fill port 18 is shown in the corner of top transparent plate 12 along with an exit port 20 located in an opposite corner. Ideally, plates 12 and 14 are configured to be parallel to one another and spaced apart by distances ranging from 0.5 to 50 mils. Thus with sealing means 16 around the perimeter a cavity is provided for holding a liquid or fluid suspension.

FIG. 2 shows a view A—A which is a cross-sectional view of the light valve cell shown in FIG. 1. The orientation of transparent plates 12 and 14 and sealing means 16 is clearly shown. The hidden exit port 20 has been shown. The cavity 22 holds the fluid suspension.

Light valve cells of this type usually have transparent electrodes coated on the inner surfaces of plates 12 and 14. It is also possible, but less effective, to place such electrodes on the outer surfaces of said plates. A potential difference established between these electrodes creates an electric field across the bulk of the volatile liquid suspension and creates the desired optical changes effected by the light valve cell.

Figure 5:
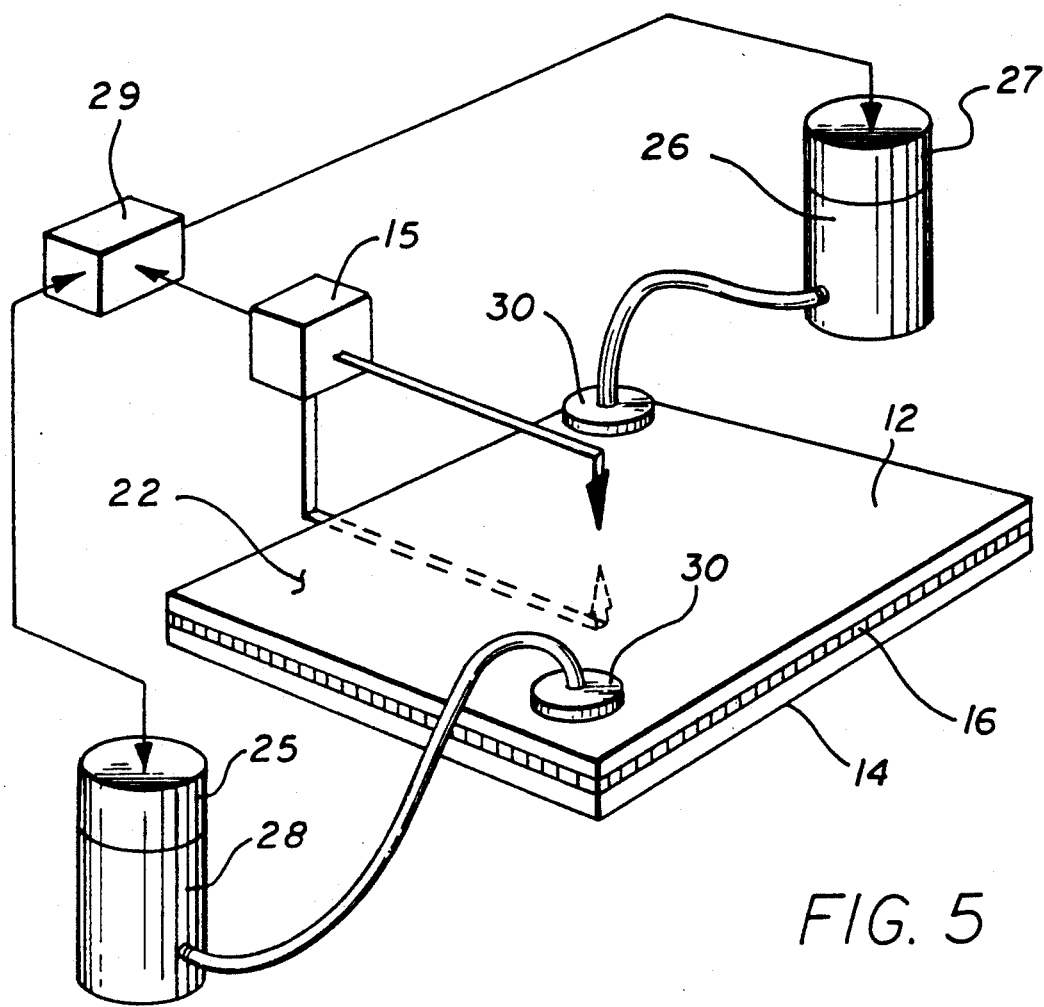
FIG. 5 shows a flat panel light valve cell configured for filling with a fluid suspension.

FIG. 5 shows an example of a configuration use during filling of the light valve cavity 22 with the fluid suspension. The process of filling cavity 22 is accomplished by attaching a filling vessel 28 through a fill disk 24 to the entry port and a receiving reservoir 26 via a second fill disk 24 to the exit port. The filling vessel contains the liquid suspension for filling cavity 22. This liquid suspension, presently considered to be a volatile liquid, but also possible to be any other type of liquid, is forced into fill port 18 to fill cavity 22 and then subsequently exiting through exit port 20. By attaching a reservoir at exit port 20, when cavity 22 is filled with the liquid suspension, the overflow will flow smoothly into the reservoir. After cavity 22 has been completely filled and receiving reservoir 26 has taken up a certain amount of the overflow fluid, the pressure within the cavity can be adjusted in one of several ways.

By leaving receiving reservoir 26 open to atmospheric pressure and removing the pressure at the filling port for a short period of time the liquid within the cavity will approach atmospheric pressure as an equilibrium condition. In most situations this condition should prove satisfactory for achieving the optical characteristics required for the plate and the spacing uniformity required in a light valve device.

For cases where the plates may tend to remain bowed outward as caused by the pressure put on them during filling with the liquid suspension, as would be more likely to occur if the plates were oriented in a vertical fashion during filling, such bowing may be eliminated by first removing the filling pressure at the fill port and applying a slight vacuum or negative pressure to the reservoir at the exit port. This procedure has the tendency to put the liquid suspension within the cavity in a tension mode and will allow the pressure level of said liquid to be drawn to a point below the atmospheric pressure around the plates. This negative pressure or vacuum will be applied to a liquid completely filling the cavity void; therefore, possible vaporization of the volatile liquid will be eliminated by the internal liquid tensile forces within the liquid suspension.

A possibly more direct but less controllable method at returning the plates to a parallel condition is to apply pressure to the outer surfaces of the plates forcing them together. And had a vacuum been directly applied at exit port 20 to draw the liquid from the filling vessel into cavity 22, as used in prior methods, the volatility of the liquid would have caused it to essentially boil or vaporize forming bubbles within its volume as it filled the cavity.

The amount of pressure differential applied at exit port reservoir 26 and the time allowed for equilibrium to establish itself will set the final pressure condition within the cavity, and the achievement of desired optical characteristics for the light valve.

For manufacturing purposes it is necessary to establish a filling means and reservoir means at the fill and exit ports in a fashion that saves time and functions absolutely in the process of moving a liquid into and out of the cavity. FIG. 3 shows details of a vacuum attachment designed to accomplish this procedure in an efficient and effective matter.

As depicted, the body of a fill disk device 30 is cylindrical in shape with a preselected thickness. The lower surface is outfitted with two concentric O rings 32 and 34, a fluid suspension hole 38 which penetrates through the disk, and a vacuum port 36 placed between O rings 32 and 34. A cross-section of filling device 30 is shown in FIG. 4 as view B—B. If desired, lower surface 42 may be shaped to provide a sculptured cavity to enhance the vacuum to be established between O rings 32 and 34, and to enhance the flow of the liquid suspension through port 38.

The upper surface of the device is essentially flat but configured with a connecting fixtures to accommodate connection of vessels containing the fluid suspension to port 38, and to accommodate a connection to a vacuum device through a nipple 40 which surrounds the vacuum port 36.

The fill disk device 30 functions by attaching to the surface of the light valve on fill port 18 and/or exit port 20 by applying a vacuum through port 36 which causes the device to seal to the surface of plate 12 much as a suction dart would seal against a wall when the air is removed from its rubber cavity. The fill disk once sealed to plate 12 may then facilitate the filling of the cavity with the fluid suspension by allowing the fluid to flow through port 38 and into cavity 22 through filling port 18, and thereafter out of the cavity 22 into a reservoir 26 attached to a similar device located at exit port 20.

The connecting fill disk devices as described above, or in any similarly configured geometry, are easily recognizable as being very efficient and effective at facilitating a manufacturing assembly line approach to controlled filling of the light valve cavities with a volatile liquid suspension. It is to be recognized that the term fluid includes but is not limited to fluid suspensions. However, the apparatus and technique presented here have been designed to specifically overcome problems encountered with volatile liquids forming essentially the solvent of the fluid suspension being utilized.

The benefit of using this technique and apparatus with the concepts presented in U.S. Pat. Nos. 3,742,600 and 3,912,365 by Lowell are readily obvious. Where Lowell has suggested the use of sized beads to protect against plates 12 and 14 from being drawn into a concave configuration when the pressure within the cavity is lowered below that outside, such use of beads could have beneficial application in combination with the method taught herein.

While specific embodiments of the invention herein have been illustrated, it will be appreciated that the invention is not limited thereto, since many modifications may be made by one skilled in the art which fall within the true spirit and scope of the invention.

What is claimed is:

1. A method for filling a cavity with a volatile fluid wherein said cavity occurs between two parallel transparent plates spaced apart a small predetermined distance and sealed around their edges to complete the cavity enclosure which comprises:
   a) establishing a fill port and an exit port in said cavity;
   b) attaching a reservoir to said exit port to receive overflow of said volatile fluid when said cavity has been filled to capacity;
   c) attaching a filling vessel to said fill port, said filling vessel containing said volatile fluid;
   d) applying pressure to the volatile fluid within said filling vessel causing the volatile fluid to controllably be forced to flow into said cavity;
   e) adjusting said pressure to a predetermined level when said cavity is completely full and a predetermined amount of the volatile fluid has passed into said reservoir; and
   f) allowing the pressure within the cavity to reach equilibrium at said predetermined pressure level as controlled by said reservoir and said filling vessel.

2. The method according to claim 1 which further comprises the additional step of sealing said fill and exit ports to complete a hermetic seal to said cavity.

3. The method according to claim 1 wherein said predetermined pressure level is atmospheric pressure level.

4. The method according to claim 1 wherein said predetermined pressure level is a negative pressure level set slightly below atmospheric pressure level.

5. A method for filling a cavity with a volatile fluid wherein said cavity occurs between two parallel transparent plates spaced apart a small predetermined distance and sealed around their edges to complete the cavity enclosure which comprises:
   a) establishing a fill port and an exit port in said cavity;
   b) attaching a reservoir to said exit port to receive overflow of said volatile fluid when said cavity has been filled to capacity;
   c) attaching a filling vessel to said fill port, said filling vessel containing said volatile fluid;
   d) applying pressure to the volatile fluid within said filling vessel causing the volatile fluid to controllably be forced to flow into said cavity;
   e) adjusting said pressure to a predetermined level when said cavity is completely full and a predetermined amount of the volatile fluid has passed into said reservoir;
   f) allowing the pressure within the cavity to reach equilibrium at said predetermined pressure level as controlled by said reservoir and said filling vessel;
   g) monitoring the orientation of said transparent plates during the filling and pressure equalization steps whereby the degree of parallelism between said transparent plates is measured; and
   h) repeating steps e) through g) should said transparent plates by out of parallelism beyond a predetermined amount.

6. The method according to claim 5 which further comprises the additional step of sealing said fill and exit ports to complete a hermetic seal to said cavity.

* * * * *